United States Patent
Hollier et al.

[11] Patent Number: 6,119,083
[45] Date of Patent: *Sep. 12, 2000

[54] TRAINING PROCESS FOR THE CLASSIFICATION OF A PERCEPTUAL SIGNAL

[75] Inventors: Michael P Hollier; Philip Gray, both of Suffolk, United Kingdom

[73] Assignee: British Telecommunications public limited company, London, United Kingdom

[*] Notice: This patent is subject to a terminal disclaimer.

[21] Appl. No.: 09/043,410

[22] PCT Filed: Jan. 30, 1997

[86] PCT No.: PCT/GB97/00265

§ 371 Date: Mar. 19, 1998

§ 102(e) Date: Mar. 19, 1998

[87] PCT Pub. No.: WO97/32428

PCT Pub. Date: Sep. 4, 1997

Related U.S. Application Data

[63] Continuation-in-part of application No. 08/671,931, Jun. 27, 1996, Pat. No. 5,799,133.

[30] Foreign Application Priority Data

Feb. 29, 1996 [EP] European Pat. Off. .............. 96301393
Feb. 29, 1996 [GB] United Kingdom .................. 9604315

[51] Int. Cl.[7] .................................................. G01L 15/06
[52] U.S. Cl. .......................... 704/243; 704/232; 704/202; 706/25; 348/742
[58] Field of Search ................................. 704/500–504, 704/202, 243, 232; 348/384, 844, 739, 742; 706/25

[56] References Cited

U.S. PATENT DOCUMENTS 4,860,360 8/1989 Boggs .
4,972,484 11/1990 Theile et al. .
5,301,019 4/1994 Citta ........................................ 348/416
5,621,854 4/1997 Hollier .
5,630,019 5/1997 Kochi .

FOREIGN PATENT DOCUMENTS

| 3032699 | 4/1982 | Germany . |
| 04 345327 | 12/1992 | Japan . |
| 2218299A | 11/1989 | United Kingdom . |
| 2218300A | 11/1989 | United Kingdom . |
| WO 94/00922 | 1/1994 | WIPO . |
| WO 95/01011 | 1/1995 | WIPO . |
| WO 95/15035 | 6/1995 | WIPO . |
| WO 96/06495 | 2/1996 | WIPO . |
| WO 96/06496 | 2/1996 | WIPO . |
| WO 97/05730 | 2/1997 | WIPO . |

OTHER PUBLICATIONS

Yogeshwar et al. (A New Perceptual Model for Video) Rutgers University, NJ. pp. 188–193, 1990.

Bellini et al. (Analog Fuzzy Implementation of a Perceptual Classifier for Videophone Sequences) Universita di Bologna, Italy, pp. 787–794, Jul. 1996.

(List continued on next page.)

*Primary Examiner*—David R. Hudspeth
*Assistant Examiner*—Abul K. Azad
*Attorney, Agent, or Firm*—Nixon & Vanderhye P.C.

[57] ABSTRACT

Training apparatus and method for establishing the network definition function of a trainable processing apparatus for analyzing a signal, includes providing a training sequence having a first signal and a distorted version of the first signal, receiving the training sequence and generating a distortion perception measure for indicating the extent to which the distortion would be perceptible to a human observer, and applying the distortion perception measure to the trainable processing apparatus to determine the network definition function.

49 Claims, 8 Drawing Sheets

OTHER PUBLICATIONS

IEEE Int Conf on Communications—Session 33.3, vol. 2, Jun. 7–10, 1987, Seattle, US, pp. 1164–1171, Quincy, "Prolog–Based Expert Pattern Recognition System Shell for Technology Independent, User–Oriented Classification of Voice Transmission Quality".

IEEE Pacific Rim Conference on Communications, Computers and Signal Processing, Jun. 1–2, 1989, Victoria, CA, Kuichek et al, "Speech Quality Assessment Using Expert Pattern Recognition Techniques".

Patent Abstracts of Japan, vol. 17, No. 202 (E–1353), Apr. 20, 1993 & JP–A–04 345327 (Nippon Telegr&Teleph Corp), Dec. 1, 1992.

Beerends, "A Perceptual Audio Quality Measure Based on a Psychoacoustic Sound Representation", A. Audio Eng. Soc., vol. 40, No. 12, 1992, pp. 963–978.

Brandenburg et al, "NMR and Masking Flag", Evaluation of Quality Using Perceptual Criteria, AES $11^{th}$ International Conference, pp. 169–179, 1992.

Zwicker et al, "Audio Engineering and Psychoacoustics: Matching Signals to the Final Receiver, the Human Auditory System", J. Audio Eng. Soc., vol. 39, No. 3, 1991, pp. 115–126.

Irii et al, "Objective Measurement Method for Estimating Speech Quality of Low–Bit–Rate Speech Coding", NTT Review, vol. 3, No. 5, Sep. 1991, pp. 79–87.

Dimolitsas et al, "Objective Speech Distortion Measures and Their Relevance to Speech Quality Assessments", IEE Proceedings, vol. 136, Pt. 1, No. 5, Oct. 1989, pp. 317–324.

Herre et al, "Analysis Tool for Realtime Measurements Using Perpetual Criteria", AES $11^{th}$ International Conference, 1992.

Kalittsev, "Estimate of the Information Content of Speech Signals", 1298 Telecommunications and Radio Engineering 47 (1992), Jan., No. 1, New York, US, pp. 11–15.

Moore et al, "Suggested Formulae For Calculating Auditor–Filter Bandwidths and Excitation Patterns", J. Acoust. Soc. Am, 74 (3), Sep. 1983, pp. 750–753.

Gierlich, "New Measurement Methods for Determining the Transfer Characteristics of Telephone Terminal Equipment", Proceedings of 1992, IEEE International Symposium on Circuits and Systems, May 10–13, 1992, San Diego (US), New York (US), vol. 4, pp. 2069–2072.

Sobolev, "Estimation of Speech Signal Transmission Quality from Measurements of Its Spectral Dynamics",Telecommunications and Radio Engineering, vol. 47, No. 1, Jan. 1992, Washington, US, pp. 16–21, XP000316414.

TRAINING PROCESS FOR THE CLASSIFICATION OF A PERCEPTUAL SIGNAL

RELATED APPLICATION

This is a continuation-in-part of our earlier Ser. No. 08/671,931 filed Jun. 27, 1996, now U.S. Pat. No. 5,799,133 issued Aug. 25, 1988.

BACKGROUND OF THE INVENTION

1. Field of the Invention

This invention relates to the classification of data which can be used to train a trainable process. It is of application to the assessment of signals carried by a telecommunications system, for example to assess the condition of telecommunications systems whilst in use. Embodiments will be described of application to audio signals carrying speech, and to video signals.

2. Related Art

Signals carried over telecommunications links can undergo considerable transformations, such as digitisation, data compression, data reduction, amplification, and so on. All of these processes can distort the signals. For example, in digitising a waveform whose amplitude is greater than the maximum digitisation value, the peaks of the waveform will be converted to a flat-topped form (a process known as peak clipping). This adds unwanted harmonics to the signal. Distortions can also be caused by electromagnetic interference from external sources.

Many of the distortions introduced by the processes described above are non-linear, so that a simple test signal may not be distorted in the same way as a complex waveform such as speech, or at all. For a telecommunications link carrying data it is possible to test the link using all possible data characters; e.g. the two characters 1 and 0 for a binary link, the twelve tone-pairs used in DTMF (dual tone multi-frequency) systems, or the range of "constellation points" used in a QAM (Quadrature Amplitude Modulation) system. However an analogue signal does not consist of a limited number of well-defined signal elements, but is a continuously varying signal. For example, a speech signal's elements vary according not only to the content of the speech (and the language used) but also the physiological and psychological characteristics of the individual talker, which affect characteristics such as pitch, volume, characteristic vowel sounds etc.

It is known to test telecommunications equipment by running test sequences using samples of the type of signal to be carried. Comparison between the test sequence as modified by the equipment under test and the original test sequence can be used to identify distortion introduced by the equipment under test. However, these arrangements require the use of a pre-arranged test sequence, which means they cannot be used on live telecommunications links—that is, links currently in use—because the test sequence would interfere with the traffic being carried and be perceptible to the users, and also because the live traffic itself (whose content cannot be predetermined) would be detected by the test equipment as distortion of the test signal.

In order to carry out tests on equipment in use, without interfering with the signals being carried by the equipment (so-called non-intrusive testing), it is desirable to carry out the tests using the live signals themselves as the test signals. However, a problem with using a live signal as the test signal is that there is no instantaneous way of obtaining, at the point of measurement, a sample of the original signal. Any means by which the original signal might be transmitted to the measurement location would be as subject to similar distortions as the link under test.

The present Applicant's co-pending International Patent applications WO96/06495 and WO96/06496 (both published on Feb. 29th 1996) propose two possible solutions to this problem. WO96/06495 describes the analysis of certain characteristics of speech which are talker-independent in order to determine how the signal has been modified by the telecommunications link. It also describes the analysis of certain characteristics of speech which vary in relation to other characteristics, not themselves directly measurable, in a way which is consistent between individual talkers, and which may therefore be used to derive information about these other characteristics. For example, the spectral content of an unvoiced fricative varies with volume (amplitude), but in a manner independent of the individual talker. The spectral content can thus be used to estimate the original signal amplitude, which can be compared with the received signal amplitude to estimate the attenuation between the talker and the measurement point.

In WO96/06496, the content of a received signal is analysed by a speech recogniser and the results of this analysis are processed by a speech synthesiser to regenerate a speech signal having no distortions. The signal is normalised in pitch and duration to generate an estimate of the original speech signal which can be compared with the received speech signal to identify any distortions or interference, e.g. using perceptual analysis techniques as described in International Patent Applications WO94/00922 and WO95/15035.

Typically speech transmission over a limited bandwidth employs data reduction e.g. linear predictive codecs (LPCs)). Such codecs are based on an approximation to the human vocal tract and represent segments of speech waveform as the parameters required to excite equivalent behaviour in a vocal tract model.

In the Applicant's International Patent Specification WO97/05730, there is disclosed a method and apparatus for assessing the quality of a signal carrying speech, in which the signal is analysed according to a spectral representation model (preferably an imperfect vocal tract model, although auditory models may be used instead) to generate output parameters, the output parameters are classified according to a predetermined network definition function, and an output classification is generated. The classifications can be generated according to a network definition function which is derived in a preliminary step from data for which the output value is known. Alternatively, it could be derived according to predetermined rules derived from known characteristics known to occur under certain conditions in the system to be tested.

The term "auditory model" in this context means a model whose response to a stimulus is approximately the same as the response of the human auditory system (i.e. the ear-brain combination). It is a particular category of the more general term "perceptual" model; that is, a model whose response to a stimulus is approximately the same as the response of the human sensory system (i.e. eye-brain, ear-brain, etc.).

The term 'imperfect vocal tract model' in this context means a vocal tract model which is not 'ideal' but is also capable of generating coefficients relating to auditory spectral elements that the human vocal tract is incapable of producing. In particular it means a model that can parametrically represent both the speech and the distortion signal elements, which is not the normal goal for vocal tract model design. Speech samples known to be ill-conditioned or well-conditioned, (i.e. respectively including or not including such distortion elements) are analysed by the vocal tract model, and the coefficients generated can then be identified as relating to well or ill-conditioned signals, for example by a trainable process such as a neural network. In this way classification data can be generated for vocal tract parameters associated with each type of signal, (any parameters which are associated with both, and are therefore unreliable indicators, can be disregarded in generating the classification data), so that when an unknown signal is subsequently processed, an output can be generated using the previously generated classification data associated with those parameters which relate to the unknown signal.

Sequences of parameters, as well as individual parameters, may also be used to characterise a signal. Data compression techniques may be used to store the parameters recorded.

The apparatus of the aforementioned WO97/05730 comprises training means for generating the stored set of classification data, the training means comprising first input means for supplying a sample of speech to the modelling means; second input means for supplying to the training means known output information (referred to hereinafter as "labels") relating to the speech sample; means for generating classification data from the modelling means based on the labels, and storage means for storing classification data generated by the modelling means.

The speech segments used in the training sample must therefore each be labelled as well or ill-conditioned. This is a major undertaking, because a typical sample comprises several hours of speech, and many such samples are required in order to train the system to respond correctly to a range of talkers, conditions, and other variables. The duration of an individual segment is typically 20 milliseconds, so in all several million segments must be labelled. Moreover it would be necessary to use a number of human analysts to classify each sample to obtain a statistically valid result because of individual variations in perception, concentration, and other factors. Moreover, it is not possible for a human observer to accurately identify whether individual segments of such short duration are well- or ill-conditioned.

SUMMARY OF THE INVENTION

According to a first aspect of the present invention, there is provided a training apparatus for training a signal analysis apparatus of the type arranged to detect predetermined components of a signal, characteristic of distortion being present in the signal, and for generating a classification indicative of the severity and/or types of distortion present, the training apparatus comprising means for providing a training sequence comprising a first signal and a distorted version of the first signal, analysis means for receiving the training sequence and generating a distortion perception measure for indicating the extent to which the distortion would be perceptible to a human observer, and means for applying the distortion perception measure and the distorted signal to the signal classification apparatus to determine the classifications to be applied to subsequently input signals.

In a further aspect the invention comprises a method for training a trainable signal analysis process of the type in which predetermined components of a signal characteristic of distortion being present in the signal are detected, and a classification indicative of the severity and/or types of distortion present is generated, the training method comprising the steps of providing a training sequence comprising a first signal and a distorted version of the first signal, measuring the extent to which the distortion of the signal will be perceptible to a human observer, and defining a classification operation in accordance with the result of said measurement, the classification operation being arranged to classify subsequently input signals in accordance with the presence or absence of perceptually significant distortion.

The invention also extends to a classification means for signal classification apparatus arranged to detect and classify distortions occurring in signals input to the apparatus in accordance with classification data stored in the classification means, wherein the data stored in the classification means has been generated according to the method of the invention.

In a preferred arrangement the measurement process estimates the effect which would be produced on the human sensory system by distorted and undistorted versions of the same signal, and determines the differences between the said effects, and generates said distortion perception measure in dependence upon said difference. Preferably, the measurement process generates said distortion perception measure to depend upon the significance of said distortion to a human observer, and to depend non-linearly upon the amplitude of said distortion. The measurement process preferably generates a plurality of spectral component signals of said test signal and/or said distorted signal, and estimates, for each spectral component signal, the masking effect which that spectral component signal would produce on the human sensory system.

In a speech application, the training sequences will typically be large corpora of natural speech, in order to account for the variations in individual talkers' characteristics. In the preferred embodiment the measurement process comprises the steps of decomposing the distorted speech signal into a plurality of spectral component bands, the spectral component bands being shaped to provide spectral masking; calculating the temporal masking of the signal due to preceding and/or succeeding temporal portions thereof; forming, for each of the spectral component signals, a representation of the difference between the component signal of the distorted signal and a correspondingly calculated component of the test signal; and generating said distortion perception measure from said difference measure.

Suitable speech analysis processes are described in International Patent Specifications WO94/00922, WO95/01011 and WO95/15035. By labelling the segments automatically, using a distortion perception measure, the classification operation can be derived objectively, but nevertheless according to factors perceptible to a human observer.

The invention is not limited to speech signals, or even to audio signals. The same principles can be applied for example to video signals. In such a case individual frames of the video signal can form the individual elements of the training sequence.

Video signals are subject to a number of distortions which can cause effects perceptible to the viewer. Distortions which affect the boundaries between different image elements are generally perceptually more significant than changes which take place within a body perceived by an observer as part of one image element. Such boundary distortions include blurring, displacement (thereby changing the shape of an object), the complete disappearance of a boundary, or indeed the appearance of a boundary where there should be no boundary. Therefore in a preferred arrangement the system identifies distortions which affect the characteristics of boundaries as being of greater perceptual significance than other types of distortion.

A boundary is perceived by a viewer where there is an abrupt change in some property of the image; usually brightness and/or colour. Two such changes spatially close together may be perceived as a single boundary, e.g. a line separating two areas of otherwise similar brightness and colour. Boundaries may therefore be identified by spectral decomposition of the image derived from the signal. An abrupt change produces a high-frequency 'spike' in the spectral decomposition. In a colour system, a change in colour is identifiable as a change in the relative brightness of the different colours making up the image.

Distortion effects may be introduced deliberately by the producer of the video signal, so it may be preferable to monitor a video signal for sufficiently long to identify whether the effect which has been identified persists, (suggesting a fault in transmission), or was transient, (suggesting that it was introduced deliberately). Such effects are less likely on speech systems.

Trainable processes such as neural nets function most effectively with simple binary tests (good/bad; yes/no). It is therefore advantageous to arrange the monitoring system to have a number of such processes operating independently, each testing a different property or combination of properties, and each relating to one or more different parameters.

The invention may be used to train or retrain a trainable system in situ. This allows the trainable system to be trained on a real system, allowing it to recognise a new characteristic as the system to be monitored develops. This in situ training can be done by transmitting a training sequence over the system to be monitored, (temporarily occupying one channel of the system), and comparing the sequence received with an identical sample of the same sequence generated at the monitoring location.

BRIEF DESCRIPTION OF THE DRAWINGS

Exemplary embodiments of the invention will now be described, with reference to the accompanying drawings which show the functional relationship of the various elements of the embodiment. It will be appreciated that the invention can be embodied advantageously in software to run on a general purpose computer.

DETAILED DESCRIPTION OF EXEMPLARY EMBODIMENTS

Figure 1:
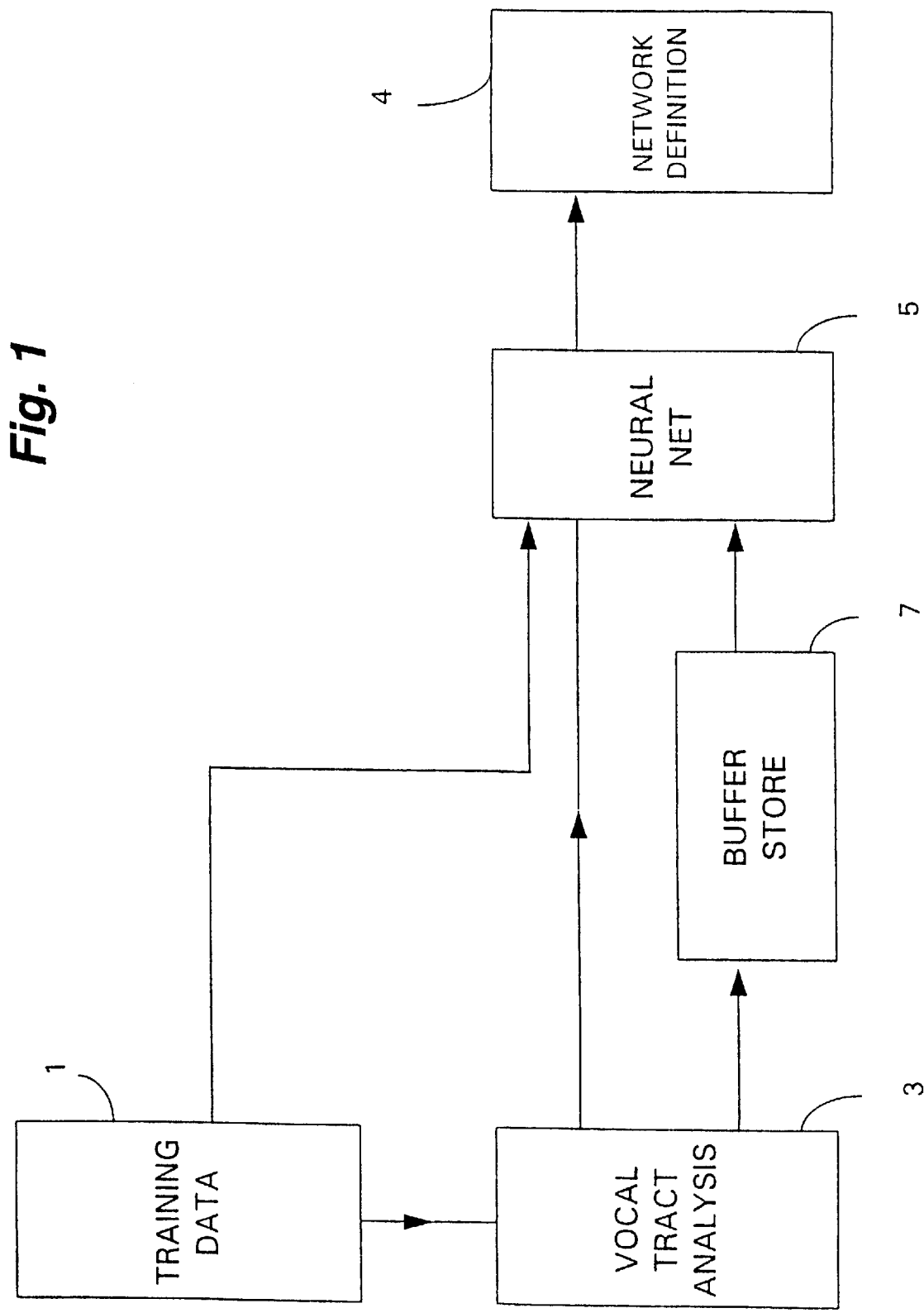
FIG. 1 shows the functional elements of a trainable system for analysing a speech signal, configured for a training process.

The three embodiments will now be described in detail. Firstly, the embodiment of FIGS. 1 to 5, configured for a speech-carrying signal, will be described.

To aid understanding of this embodiment it is appropriate here to briefly discuss the characteristics of vocal tract analysis systems and trainable processes. The vocal tract is a non-uniform acoustic tube which extends from the glottis to the lips and varies in shape as a function of time [Fant G C M, "Acoustic Theory of Speech Production", Mouton and Co., 's-gravehage, the Netherlands, 1960]. The major anatomical components causing the time varying change are the lips, jaws, tongue and velum. For ease of computation it is desirable that models for this system are both linear and time-invariant. Unfortunately, the human speech mechanism does not precisely satisfy either of these properties. Speech is a continually time varying-process. In addition, the glottis is not uncoupled from the vocal tract, which results in non-linear characteristics [Flanagan J L "Source-System Interactions in the Vocal Tract", Ann. New York Acad. Sci 155, 9–15, 1968]. However, by making reasonable assumptions, it is possible to develop linear time invariant models over short intervals of time for describing speech events [Markel J D, Gray A H, "Linear Prediction of Speech", Springer-Veriag Berlin Heidelberg New York, 1976]. Linear predictive codecs divide speech events into short time periods, or frames, and use past speech frames to generate a unique set of predictor parameters to represent the speech in a current frame [Atal B S, Hanauer S L "Speech Analysis and Synthesis by Linear Prediction of the Speech Wave" J. Acoust. Soc. Amer., vol. 50, pp. 637–655,1971]. Linear predictive analysis has become a widely used method for estimating such speech parameters as pitch, formants and spectra. Auditory models (time/frequency/amplitude spectrograms) rely on audible features of the sound being monitored, and take no account of how they are produced, whereas a vocal tract model is capable of identifying whether the signal is speech-like, i.e. whether a real vocal tract could have produced it. Thus inaudible differences, not recognised by auditory models, will nevertheless be recognised by a vocal tract model.

For the purpose of measuring signal quality, the output parameters generated must be sensitive to the property being measured, i.e. the perceived speech quality. The model must therefore be capable of modelling non-speech-like distortion, and therefore an ideal vocal tract model would not be suitable. An ideal model would convert all input signals into speech-like forms (not necessarily the original ones if the distortion is bad). This would make the classification process unreliable, as the distorted inputs and pure inputs would both be classified as speech like, rendering the training process impossible. It is therefore important that the vocal tract model is 'imperfect', in the sense previously defined, since the process relies on the output parameters from the vocal tract model being sensitive to the presence of non-human distortion elements in order to distinguish between ill-conditioned and well-conditioned signals. The Linear Predictive Coding model as described in "Digital Processing of Speech Signals": Rabiner L. R.; Schafer R. W; (Prentice-Hall 1978) page 396 is suitable for use as the anaiyser 3.

Spectral analysis may be used as an alternative to a vocal tract model, for example "one-third octave analysis" as discussed in Section 3.6 of "Frequency Analysis" by R. B. Randall, (published Bruet & Kjaer, 1987 (ISBN 87 87355 07 8).

The characteristics of trainable processes, and particularly neural nets, will now be discussed. In order to map a number of inputs onto a smaller number of predetermined results classes it is possible to use a series of rules, particularly if the mapping process represents a natural system. However, if the natural system is too complex, or the required mapping operates on abstract parameters, then a trainable process can be used to develop the required mapping in response to a series of known results, referred to as the training data. The known results are used to determine the relationship between the input parameters and the results classes such that subsequent unknown combinations of inputs can be classified. A neural network is designed to model the way in which the brain performs a particular task or function of interest. It is possible to train a neural network to perform useful computations through a process of learning [Haykin S, "Neural Networks, A Comprehensive Foundation", Macmillan IEEE Press, 1994]. To achieve good performance neural networks employ a massive interconnection of simple processing units. Interprocessing unit connection strengths, known as weights, are used to store the knowledge of the system. [Aleksander I, Morton H "An Introduction of Neural Computing" Chapman and Hall London, 1990]. The procedure used to perform the learning process is called the learning algorithm, the function of which is to modify the weights of the network in an orderly fashion so as to attain a desired design objective. The power of a neural network is derived from a massively parallel distributed structure and its ability to learn and therefore generalise; generalisation refers to the network producing reasonable outputs for inputs not encountered during training. Supervised learning is a form of training which involves presenting known examples of classes to the network and then modifying the interconnecting weights in order to minimise the difference between the desired and actual response of the system. The training is repeated for many examples from each of the classes of inputs until the network reaches a steady state. There is a close analogy between the input-output mapping performed by a neural network and the classification achieved by non-parametric statistical inference.

The operation of the system of the first (audio) embodiment will now be described. The system shown in FIGS. 1 and comprises a source of training data 1 (FIG. 1) and a source of live speech traffic (real data) 2 (FIG. 5) both of which provide inputs to an analyser 3. Parameters associated with the training data are also supplied from the training data source 1 to a classification unit 5, which is shown as a trainable process, specifically in this embodiment a neural network 5. It will be recognised that other trainable processes, e.g. adaptive clustering may be used. Parameters output by the analyser 3 are fed to the neural network 5. During the training process the neural network provides parameters to a store 4. These parameters define a network definition function. When real data are read, the parameters are retrieved from the store 4 and used by the neural network to perform the network definition function on the values generated by the vocal tract analyser 3 to generate classification data which are supplied to an output 6. Typically the output data are in the form of a classification based on the values generated by the analyser 3, input to the neural network 5, which operates according to the network definition function to indicate the degree of distortion identified. Several quality levels may be defined, by setting a number of output classes. For practical purposes the signal is analysed as a sequence of time frames. Parameters derived from data relating to a first time frame may be used in analysis of subsequent time frames. For this purpose the output of the vocal tract analysis 3 is stored in a buffer store 7 for later use in subsequent operations of the neural network 5.

Figure 5:
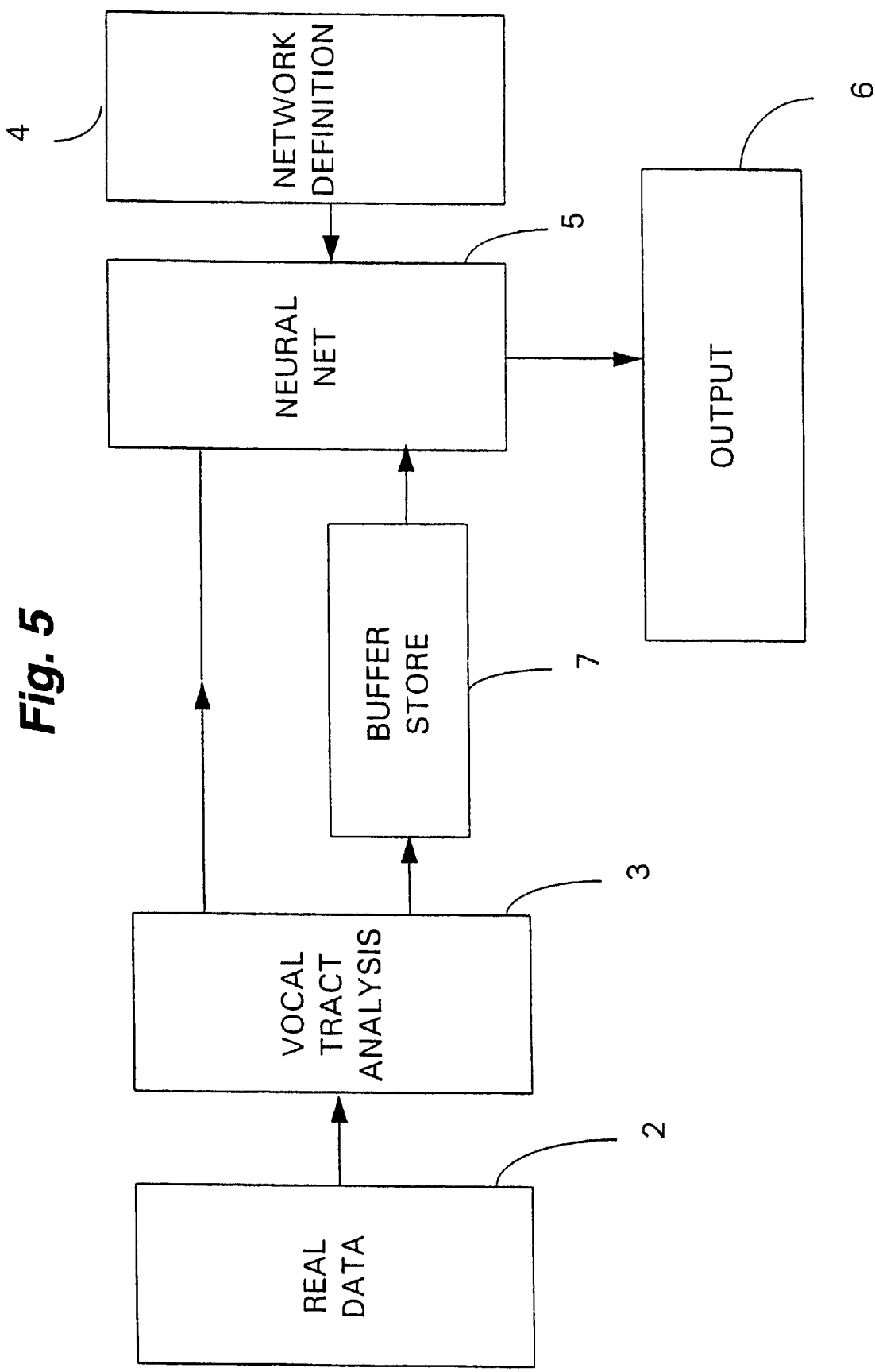
FIG. 5 shows the functional elements of the same system configured for a run with unknown data.

Before discussing the training process of the invention, the use of the system, once trained, to monitor live traffic will be described with reference to FIG. 5. Real data can be supplied from the source 2 to the vocal tract analysis system 3. Distortion and interference may cause some individual time frames of the original signal to be distorted, or to be missing altogether. For example, if a given frame can only appear following one of a small subset of the possible frames, its appearance following a frame which is not a member of that subset indicates that either the subject frame or its predecessor for both) has been distorted from some original frame which was appropriate to the context. The parameters of each individual frame may be 'permitted', (i.e. the parameters fall within the expected ranges), but a sequence of parameters, considered together, may be invalid, indicating that distortion is taking place. The parameters stored in the store 4 define a network definition function trained with such sequences. The parameters generated by the vocal tract analysis are fed as input to the neural network 5, defined by the network definition function, which classifies the data generated by the vocal tract analysis, to produce an output 6. The network definition function is defined by parameters stored in the store 4, to derive a classification of the quality of the signal supplied to the source 2.

In order to include parameters relating to time dependent properties, e.g. to identify not only whether the instantaneous characteristics of a sample are within the capabilities of the human vocal tract, but also whether the time variant properties are also within such capabilities, the output from the vocal tract analysis is stored in a buffer store 7. The stored parameters are fed as an input to the neural network as "historical" data when a subsequent sample is supplied to the neural network 5, thereby measuring the characteristics of such time-dependent samples.

Many individual telecommunications links may be connected as the source 2 sequentially, in order to monitor the signal quality of a large number of links. Although particularly suited for non-intrusive measurement processes, the invention is also usable in so-called "intrusive" measurements, in which a test signal is used as the source rather than a live one.

The output 6 may be displayed in any suitable form to a user. For example a source for which a classification representing poor performance is generated may be indicated to a network manager so that the telecommunications link represented by the source 2 can be taken out of service and repaired if necessary, the link being reestablished by another routing if possible. In one possible arrangement, such action may be controlled automatically, or it may be left to a human controller to act on the indications supplied by the output 6.

The parameters recorded for each time frame may be stored as a short code, representing the parameters. This takes up less memory, and can also shorten processing time considerably. The sequence of codes of successive time frames should, like the parameters they represent, follow one of a number of recognised sequences corresponding to real speech sounds. Should a set of parameters be identified for a time frame which have a code which should not follow the previous members of the sequence, or which is not coded for at all, this indicates that a distortion is present.

In order to generate the parameters stored in the store 4, the neural network must first be trained to establish the network definition function, using training data. This process is illustrated in FIGS. 1 to 4. Test data is supplied from a training apparatus 1 to the vocal tract analyser 3. The training apparatus 1 also supplies classification parameters relating to the test data to the neural network to allow the generation of the labels which define the network definition function.

Figure 2:
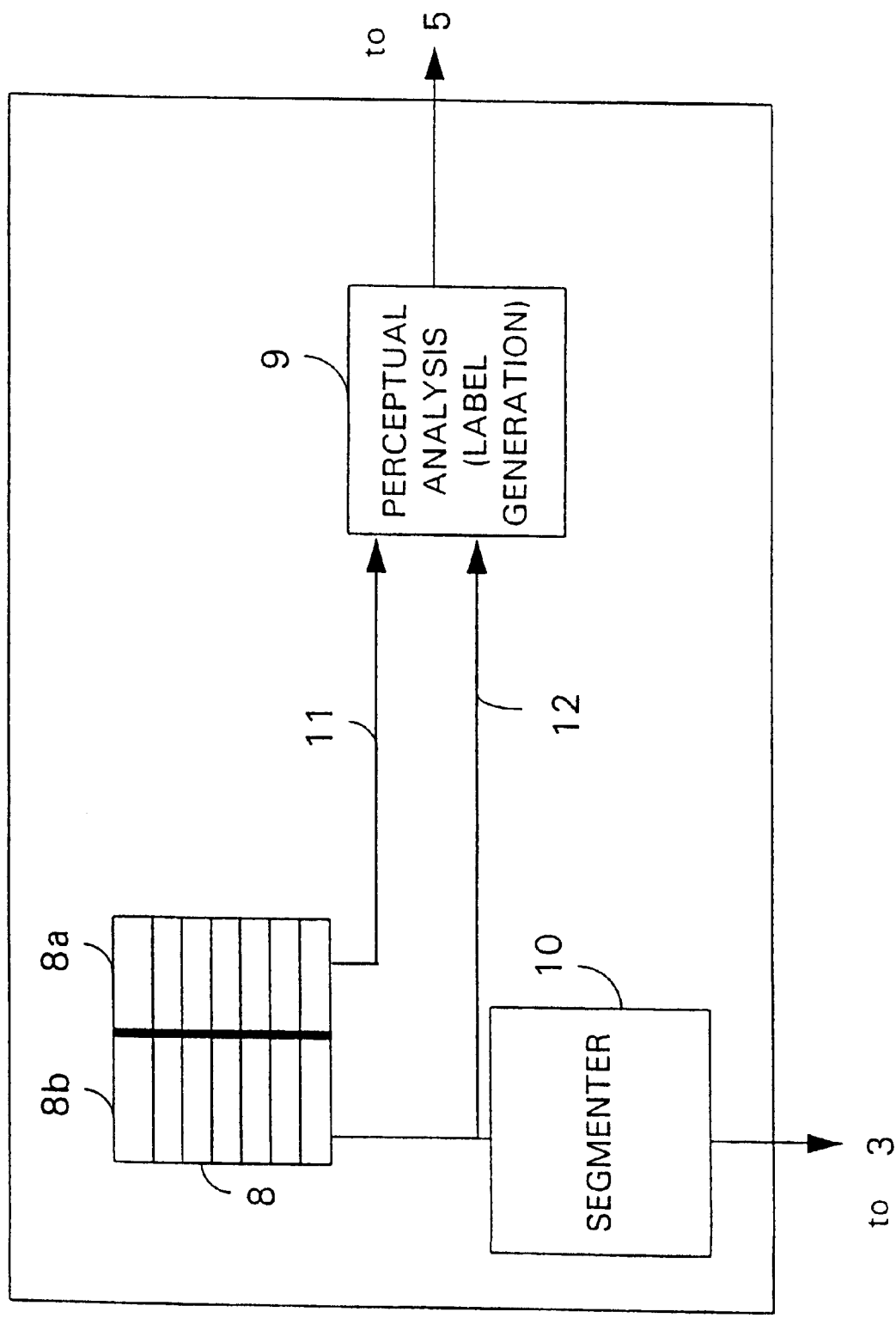
FIG. 2 shows the training apparatus of FIG. 1 in greater detail.

The generation of these labels will now be described, with reference to FIG. 2 which shows the training apparatus 1 in greater detail. In order to generate the volume of data required in order to train a neural net, using speech segments which are too short to be individually assessed accurately by a human operator, an automatic method of generating such signals has been devised. This process relies on the use of a perceptual analysis model, that is a process which assesses whether a distortion of a signal is significant to a human observer. Initially a source of test signals 8 is provided which has two associated stores (8a,8b). The first store 8a has a "good" signal sample. The complete sample is typically of length of several hours. The second store 8b has a corresponding version of the same sample, which has been subjected to distortion, by means which will be described later. The sample stored in the second store 8b includes varying degrees and types of distortion. The distorted signal is divided into short segments. The good signal from the store 8a, and its corresponding distorted version from the store 8b, are fed through respective first and second inputs 11, 12 to an analysis unit 9 which provides an output comprising a sequence of labels which are then transmitted to the neural net (FIG. 1). The distorted version of the signal is also sent to a segmenter 10, which divides the signal into individual segments (typically 20 milliseconds) corresponding to the labels. These segments are then transmitted to the vocal tract analyser 3 (FIG. 1). The analysis unit 9 compares the "good" sample with the distorted sample and generates a sequence of labels representing the degree to which the distortion present in each segment is deemed by the model to be perceptible to a human listener. This analysis process will be described in general terms here, but the analysis techniques used in published International Patent Applications numbers WO94/00922, WO95/01011, and WO95/15035 are particularly suited.

Figure 3:
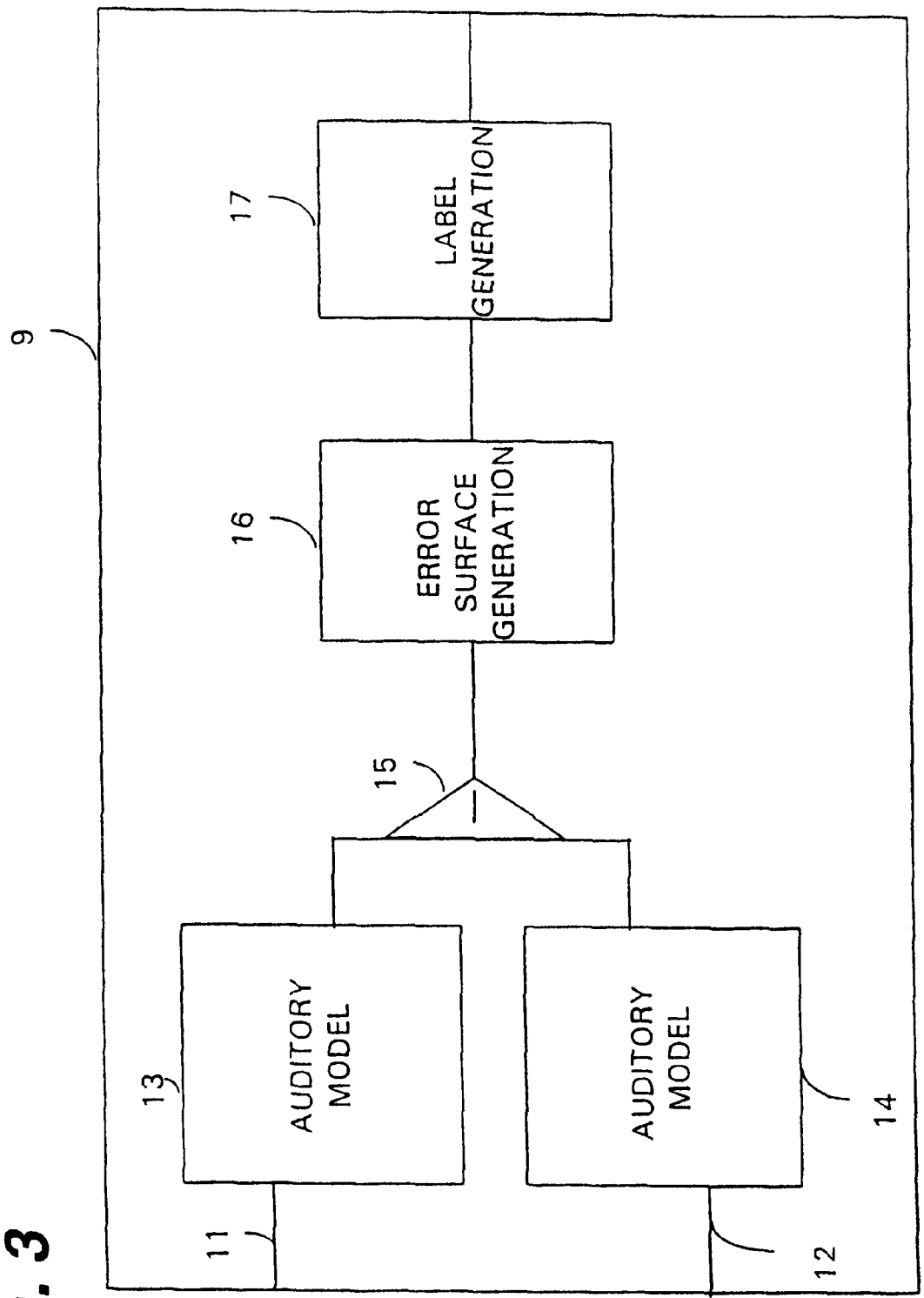
FIG. 3 shows the analysis apparatus forming part of FIG. 2 in greater detail.

FIG. 3 shows the analysis unit 9 in greater detail. The inputs 11 and 12 from the first and second stores (8a, 8b), respectively carrying the "good" signal and the distorted version of the good signal, are each fed through an auditory model (respectively 13, 14) and the outputs of the auditory models are compared in a comparator 15. It will be apparent to the skilled reader that corresponding passages of the good and distorted signal may instead be fed alternately through the same auditory model and comparison made between the outputs of this auditory model for the good and the distorted signal passages. It is in any case important that the same process is applied to both signals. The model generates a number of parameters which relates to the perceptual importance of the characteristics of individual signal segments. The process may involve separating the sample into various overlapping spectral components, using overlapping filters to model the phenomenon of simultaneous masking, in which a sound masks a quieter simultaneous sound which is close to it in frequency, and may also involve comparing each segment with one or more previous or subsequent segments to model the phenomenon of temporal masking, in which a quiet sound immediately preceding or following a louder sound is less perceptible than if the louder sound is not present.

As described in the aforementioned patent specifications, the auditory model process generates a series of values of the perceptual significance of each spectral and temporal component of the sample. Because the sample is analysed both spectrally and temporally, it is convenient to visualise this series of values as a surface, in which the perceptual significance of each spectral/temporal component is represented by defining time and pitch axes, and representing the perceptual significance for each time/spectral co-ordinate pair by the height of the surface above a plane defined by those axes. This surface is referred to herein as an "auditory surface". The values defining this surface are, of course, stored and processed digitally.

The two auditory surfaces corresponding to the "good" sample and the distorted sample are then compared in a comparator to produce a series of error values, which are compiled to form an error surface in an error surface generation unit 16. As is described in detail in the above-mentioned published international Patent Specifications, the error surface is essentially a measure over a number of time segments and frequency or pitch bands (the individual ranges of the bands having been selected to be of equal perceptual significance, e.g. by conforming the signal to the Bark scale) in which the perceived magnitude of the sound signal is represented on an axis perpendicular to both the pitch and time axes. Different weightings may be applied to positive and negative values, for example to account for the differences in impairment which result from signal loss as compared to added noise. If no distortion is present at all, the error surface will have a value of zero over the entire surface. If, as in the example to be discussed, the values on the error surface are determined as the absolute magnitude of the difference (possibly weighted as described) between auditory model outputs, all values of the error surface are positive.

As described in the aforementioned patent applications, the characteristics of the error surface can be used to derive a value for the perceptual importance of the errors carried thereon. As described in particular in international patent application WO95/15035, this may be the absolute magnitude of the error aggregated over the error surface. A final weighted value for "listening effort", $Y_{LE}$, can be derived:

$$\text{Error Activity}, E_A = 10 \log \sum_{i=1}^{n} \sum_{j=1}^{m} |c(i, j)|$$

where c(i,j) is the error value in the $i^{th}$ of n time segments and $i^{th}$ of m pitch bands of the error surface to be analyzed. This gives an indication of the absolute amount of distortion present.

Suitable threshold values for error activity $E_A$ for individual segments can be used to determine whether a particular segment should be labelled as "well conditioned" or "ill conditioned". The properties of the error surface so generated are used to derive labels in a label generator 17 appropriate to the characteristics of the error surface defined by the error surface generator 16. These labels are produced in synchronism with the segmentation of the signal in the segmenter 10. The labels are output to the neural net (FIG. 1).

Figure 4:
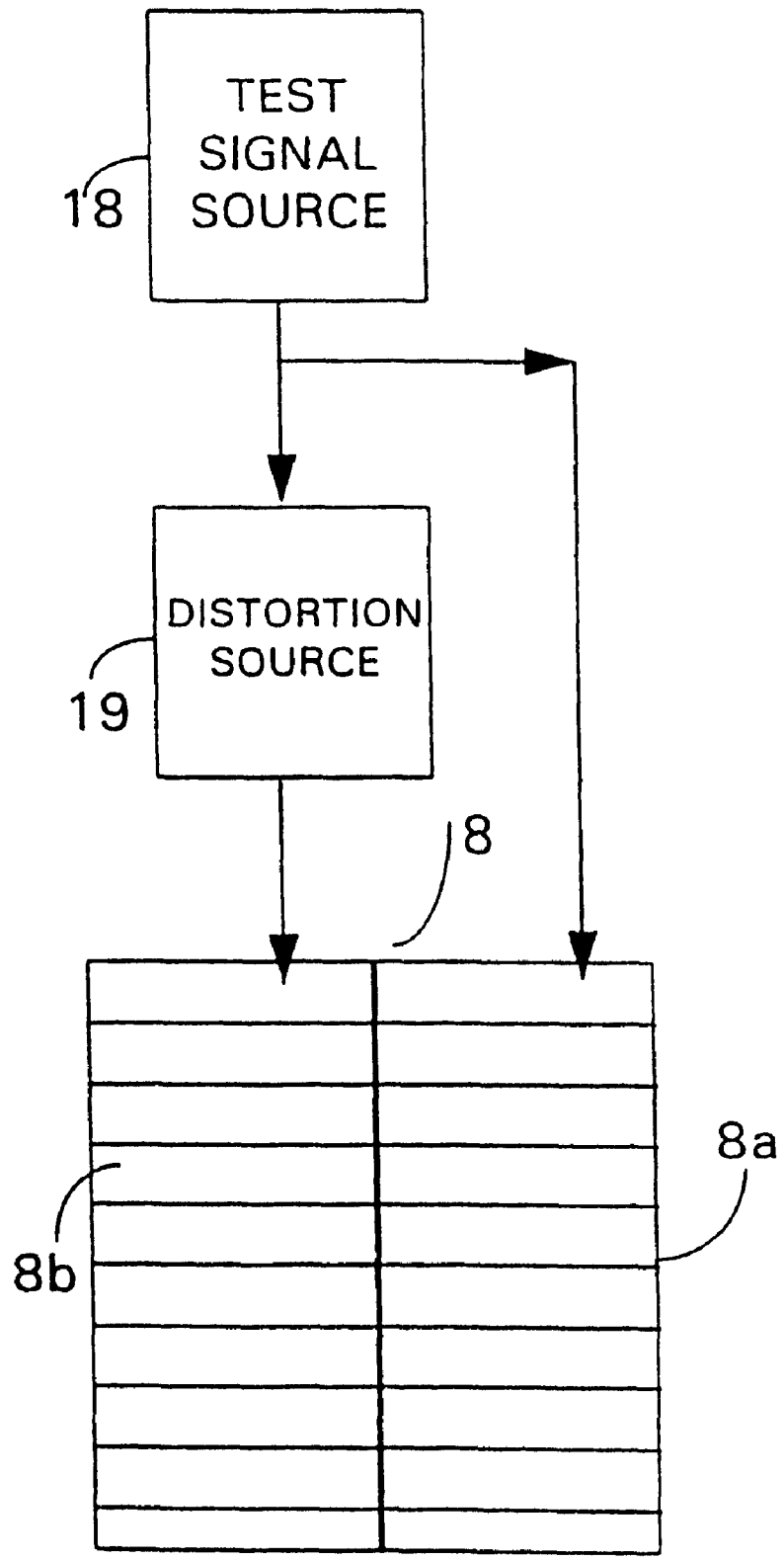
FIG. 4 shows an apparatus by which initial speech samples supplied by the data source of FIG. 2 may be generated.

The source of distorted and "good" signals used in store 8 may be supplied from a pre-generated store. Various corpora of suitable data are already available, but further data may be readily generated. The generation of such data is relatively straightforward and is illustrated in FIG. 4, in which an initial test signal from a source 18, which may comprise several samples of real speech, using different talkers in order to ensure a representative selection, is fed to the "good" store 8*a*. The same signal is also fed through the distortion generator 19. The resulting distorted signal is stored in the "distorted" signal store 8*b*. Various different sources of distortion may be applied. By using various permutations of different test signals and distortion types a large and representative corpus of test data can be generated to serve as training data to be supplied by the training data source 1.

Typical forms of distortion are supplied to the test signal by the distortion generator 19 in order to supply a representative selection of such signals to the training process. These distortions can be generated to simulate various effects. They may be generated algorithmically (i.e. by mathematical manipulation of the samples, for example to emulate a prototype system) or by passing the original signal through real apparatus, either in a test facility or in a real system such as a telecommunications network.

The labels supplied by the training apparatus 1 to the neural network 5 will inform the network of the nature of the training signal being transmitted, and therefore enable it to apply appropriate weightings to the various parameters stored in the store 4 in respect of data having these characteristics. Examples of different types of distorted and undistorted signals are supplied by the training apparatus 1, so that the output 6 may identify not only that a perceptible distortion is present, but also the extent of impairment caused by the distortion, that is, how disturbing its presence is to the listener.

In order to ensure that the network definition is accurate, test data for which a classification is known in advance may be supplied at input 2, the classification data generated by the network definition function in the neural network 5 then being compared (by means not shown) with the known classification data.

The audio system above has been described in relation to speech signals but suitable samples of other audio signals may also be used. Moreover other types of signals, for example video signals, may also be analysed in the same way, as will now be described.

In general, a video signal comprises an audio channel and three main vision components. In some specialised applications these components are the actual red, green and blue components of the image to be displayed. However, to allow compatibility between monochrome ("black-and-white") and colour systems, in most systems the vision components are a luminance ("brightness") signal, (used by both monochrome and colour receivers) and two "colour-difference" signals (used only by colour receivers). The two colour-difference signals are indicative of how much of the total luminance is contributed by, respectively, the blue and red components of the image. The third (green) component can be derived from the luminance and colour-difference signals, as it makes up the balance of the total luminance. The luminance signal and the colour-difference signals are used to generate instructions for the individual generators of the three single-colour images (red, green, blue) which, when superimposed, produce the full colour image.

Figure 6:
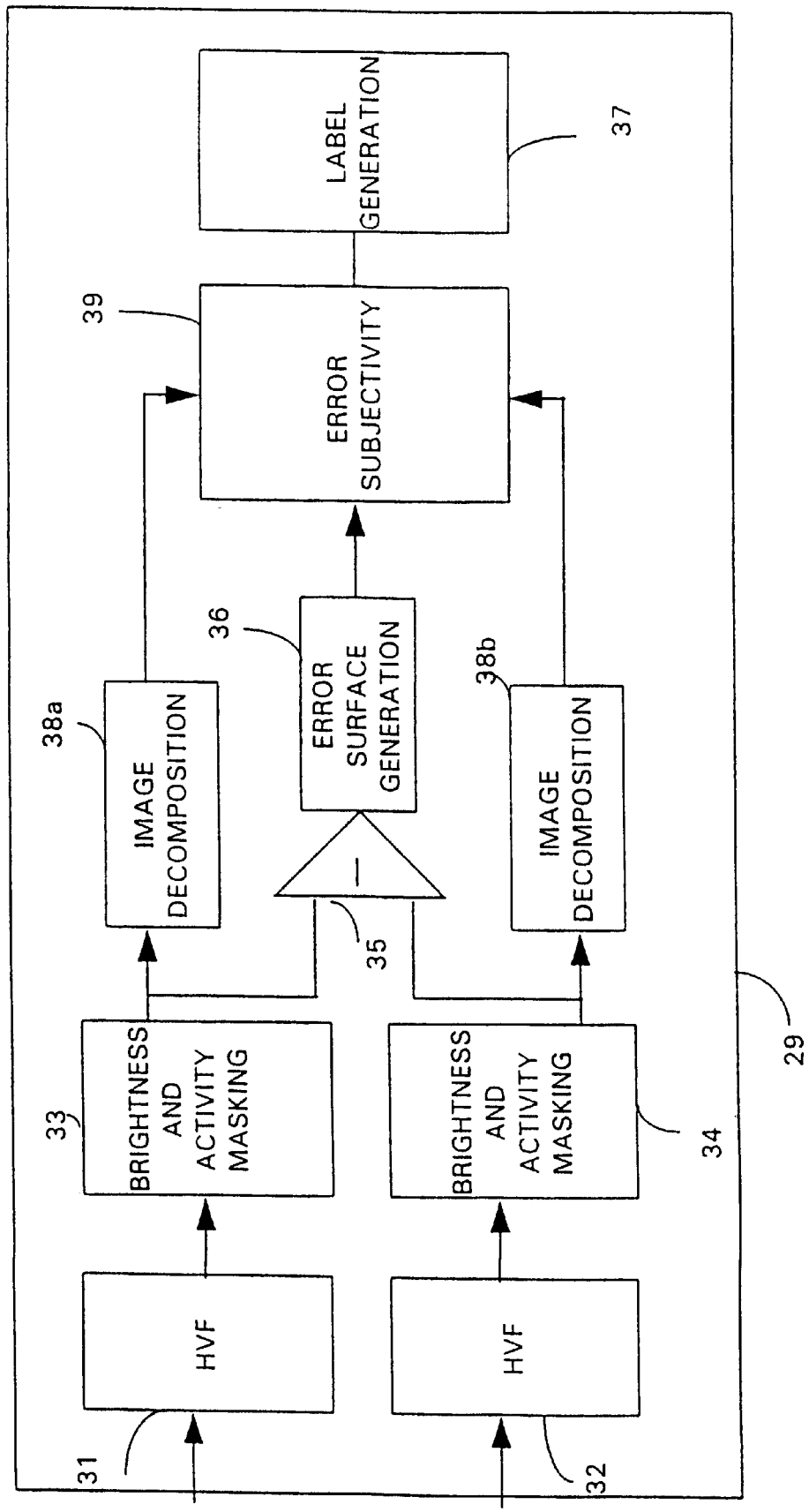
FIG. 6 shows an analysis apparatus, analogous to that of FIG. 3, for training an apparatus for analysing a video signal.

FIG. 6 shows an apparatus similar to that shown in FIG. 3, but configured for training for a video application. Sources of original and degraded signals are passed to respective human visual filters 31, 32 and then to respective brightness and activity and brightness masking units 33, 34. These signals are then compared in a comparison unit 35.

The output from the comparison unit 35 is passed to an error surface generation unit 36 which generates a series of values for the perceptual degree of error at different points in the image. There is thus generated an 'error brightness map', indicating how the perceptual degree of error varies over the image. The output from the error surface generation unit 36 provides an input to a label generation unit 37. The elements 31 to 37 all have equivalents in the speech analysis system shown in FIG. 3, each component having the same final digit as its equivalent in FIG. 3. In addition, the output relating to each signal is also passed from the masking units 33, 34 to a respective image decomposition unit 38*a*, 38*b*. The output from the error surface generation unit 36 is modified by applying weightings according to the output of the image decomposition units 38*a*, 38*b* in an error subjectivity unit 39, before being passed to the label generation unit 37.

Figure 7:
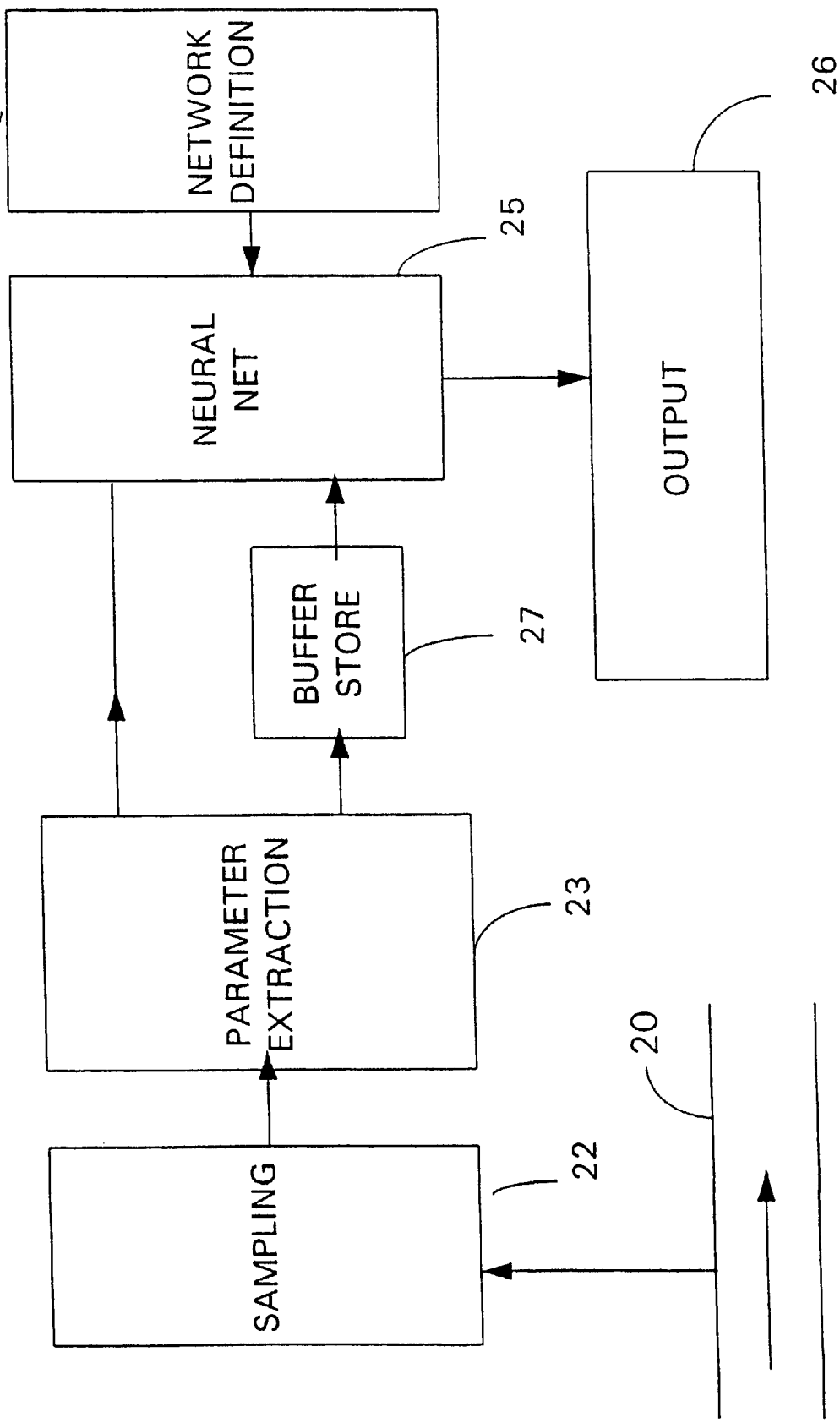
FIG. 7 shows, in block diagram form, an apparatus for analysing a video signal, analogous to that shown in FIG. 5, having been trained using the apparatus of FIG. 6.

FIG. 7 shows the basic elements of the trained apparatus, configured to analyse live data. These elements all have analogues in the speech analysis system shown in FIG. 5, equivalent components having the same reference numeral, but in this Figure prefixed by a "2". The basic elements are similar to those shown in FIG. 5, but for use with a video signal. A sampling unit 22 is connected to a source of a video signal 20. The sampling unit 22 in turn passes a signal to a parameter extraction unit 23 which in turn passes the resulting parameters by way of a buffer store 27 to a classification unit which also has an input from a network definition function store 24. The classification unit generates a classification of the input parameters determined according to the network definition function 24, which is transmitted to an output 26. A sample of the video signal is taken from a data stream (e.g. 2 Mbit/s per second), by means of the sampling unit 22. Each sample is then processed by the parameter extraction unit 23 which performs a number of functions in order to identify characteristics which indicate whether the video signal is well-conditioned or ill-conditioned. These parameters are passed to the classification unit (typically a neural net) which generates an output 26 indicative of whether the original video signal is well or ill-conditioned.

The processes performed by the parameter extraction unit typically include spectral analysis, boundary detection and analysis, and correlation with temporally adjacent frames, to produce parameters relating to the spectral components, location of boundaries, and degree of correlation, including any spatial offset in the correlations.

These parameters are then processed by the neural net to identify perceptually relevant patterns characteristic of the particular types of distortion. Parameters extracted may require correlation with temporally adjacent frames (either preceding or succeeding frames), and for this purpose a buffer store 27 of previous samples is stored for comparison with the most recently received sample. The parameters of the images produced by the unknown video signal are analysed by the neural net to return a label at the output 26 which indicates the overall quality of the signal, Alternatively, the neural net may be programmed to generate labels indicative of parameters characteristic of specified types of distortion on which it has been trained.

In the preferred arrangement measures of both overall quality and type of distortion are applied. This allows a user to both identify what remedial action is necessary, and to prioritise such actions.

In this embodiment, the auditory model (13, 14) of the first embodiment is replaced by a model operating on the same principles but in which the relevant parameters are determined by human visual perceptual characteristics, rather than aural characteristics. The perceptual importance of a distortion depends on the visual context in which it appears. Masking effects may be significant within a given video frame, or between successive frames, depending on persistence of vision characteristics of human visual perception, etc. The segmentation time is conveniently defined by the frame rate, (typically 40 milliseconds for television systems using a frame rate of 25 Hz: in a typical 'interlaced' system in which each frame is made up of two scans).

As each frame of a video transmission is in general very similar to the previous one, it would be appropriate in measuring masking and similar effects to compare segments of the video signal which relate to the same part of the image. The analysis process itself is analogous to the audio example above. Successive frames are analysed, transformed to a perceptually relevant frame of reference, using a human visual filter and masking models, the error is quantified and a label generated. The factors involved in the human visual filter model include spatial and temporal frequency resolution. The masking effects modelled are typically activity masking (large movements masking small fluctuations), and brightness masking.

There are certain forms of degradation which produce characteristic features on a video signal, and the presence of such features can be identified by the neural net 25 and used as an indicator that distortion may be present. However, the problem is more complex than with speech, because the video signal is more complex than a speech signal, and the original signal is not constrained in the way a speech signal is by physiological characteristics of the source of the signal. It is possible for a feature of a speech signal to be identified as being "non-speech-like" and therefore to identify with a reasonable degree of certainty that a distortion has been imposed. A video signal is not constrained in this way, so it is not as easy to identify with certainty whether the signal which is received has been distorted. Thus, in this embodiment the detection of a characteristic can only be indicative of a potential problem to be investigated. In particular, a distortion may have been introduced deliberately by the producer of the video image. For example, a 'blockiness' effect similar to that caused by data compression in the MPEG system can be produced deliberately by the producer of a video image, for example in order to preserve the anonymity of an individual depicted on the screen.

After extraction of the video sample, the image is analysed by the parameter extraction unit 23 to detect boundaries of features. Boundaries are typically perceived between areas (features,) in each of which a characteristic of the image, usually colour or brightness, remains constant or changes gradually. For example, although each feature may shade gradually across itself, the boundary of a feature can be determined by an abrupt change in a characteristic. Typically, even if there are two objects of similar colours, and the shading of each feature varies across the feature, the boundary between the two objects is detectable by an abrupt change in the shading. Abrupt changes in a property of the signal are detectable as short-duration, broad bandwidth components in the spectral decomposition of the image. Distortions which affect the boundaries between different image elements, for example by blurring a boundary, or displacing a boundary thereby changing the shape of an object, are perceptually more significant than changes which take place within a body perceived by an observer as part of one image element. Such perceptually significant boundary changes include the complete disappearance of a boundary, or the appearance of a boundary where there should not be one.

In order to produce the network definition function used for controlling the neural net 25, image characteristics which are indicative of degradation and of significance to a human viewer, must be identified. In order to do this the training process is carried out in a perceptual analysis label generation unit 29, shown in block diagram form in FIG. 6. This is similar in concept to the unit 9 shown in FIGS. 2 and 3.

An original (undegraded) signal and a version of the same signal having a known degradation are both first passed through the respective HVFs (Human Visual Filters) 31, 32 which conform the images to what is perceptible by the human eye/brain system. The human visual filters 31, 32 modify the power (amplitude) of signals having certain spatial or temporal frequencies in accordance with the known responses of the human optical perceptual system, such that those frequencies which are less perceptually significant are reduced in power relative to those which are more perceptually significant. The human optical perceptual system is more responsive to certain spatial and temporal frequencies than others. For example, a regular pattern of stripes is difficult to resolve at a distance. Conversely, when a single stripe is so close that it subtends a large part of the field of vision, the overall pattern is also perceptually insignificant. At some intermediate position the pattern is more perceptually important than at those extremes. Note that what is significant is not the absolute distance, but the angle subtended at the eye by each element. This can be measured in terms of lines per unit of angle subtended at the eye. This value depends of course on the distance of the observer from the screen on which the image is to be displayed, and also on the size of the image itself, but since the ideal viewing distance is in any case determined by image size, the angle subtended at the eye by an image element would not be expected to differ markedly, whatever the image size. Similarly, temporal frequency affects perceptibility of images. Slow changes are imperceptible, whilst high frequency ones are perceived as a continuous signal of intermediate shade or brightness (a phenomenon known as 'persistence of vision'). Indeed video images rely on the inability of the human optical system to resolve high frequency spatial and temporal changes, as a video image is made up of small elements both in space (pixels) and time Iframes). The human perceptual characteristics to be modelled by the filter have been well documented, for example in "Digital Pictures" by A. N. Netravali and B. G. Haskell, published in 1988 by Plenum Press, New York; ISBN 0-306-42791-5, see in particular FIG. 4-3-12.

The image next goes through a masking process (33, 34 respectively). The masking effect which one image element has on another is complex, as it depends on the spatial frequency, intensity and orientation of the masking and masked features, both relative to each other and to the observer's eye. Certain bright or rapidly moving parts of the image may mask or enhance the perceptual significance of other parts of the image. The resulting masked image brightness is output from each of the masking models 33, 34 and then compared in the difference generator 35. This produces a value for error brightness for each point of the image, thus generating an error surface. Error brightness is the magnitude of the difference between the original and degraded signal (the original signal being brighter or less bright than the degraded signal) adjusted for masking and other perceptual effects. It is convenient to use the magnitude of the difference, as this allows a non-zero average value over the image, and/or over time, to be determined. It will be noted that the co-ordinate system for the error surface in this embodiment uses the 'x' and 'y' co-ordinates of the image itself, rather than the time and pitch axes of the audio embodiment described previously. Time-dependant or spatial frequency-dependant properties may be included in the system by adding further dimensions. The resulting data is not easy to represent graphically, but the parameters of such an error surface can nevertheless be generated and manipulated digitally. The term 'error surface' is used in this specification to mean any data describing how perceptual error level varies with one or more independently variable parameters.

It will be noted that because of the way a video image is generated, the 'x' and 'y' co-ordinates of the image may both be considered time axes, the scales of which are determined by the scanning rates in the x and y directions (32 microseconds per line and 40 milliseconds per frame for a typical 625-line video image).

The output from the activity and brightness masking systems 33 and 34 are also passed to respective image decomposition units 38*a*, 38*b*. These detect the boundaries between different elements of the image. As discussed above, degradations which affect boundaries of image elements (including the complete disappearance of a boundary, or the presence of a spurious one) are perceptually the most significant. By detecting an area of the image having a highly localised component containing a high spatial frequency in its spectral decomposition, a boundary of an image element can be identified. The output of the image decomposition units 38A, 38B is used in an error subjectivity generation unit 39 to weight the error brightness map generated by the error surface generation unit 36. These weighted values are then algorithmically processed in the error subjectivity generation unit 39, for example by summing them in a manner analogous to the process for deriving error activity value in the previous embodiment, to produce an overall error subjectivity value. The overall error subjectivity value is fed to the label generation unit 37 which generates an output according to the overall error subjectivity value (e.g. by reference to one or more thresholds).

Figure 8:
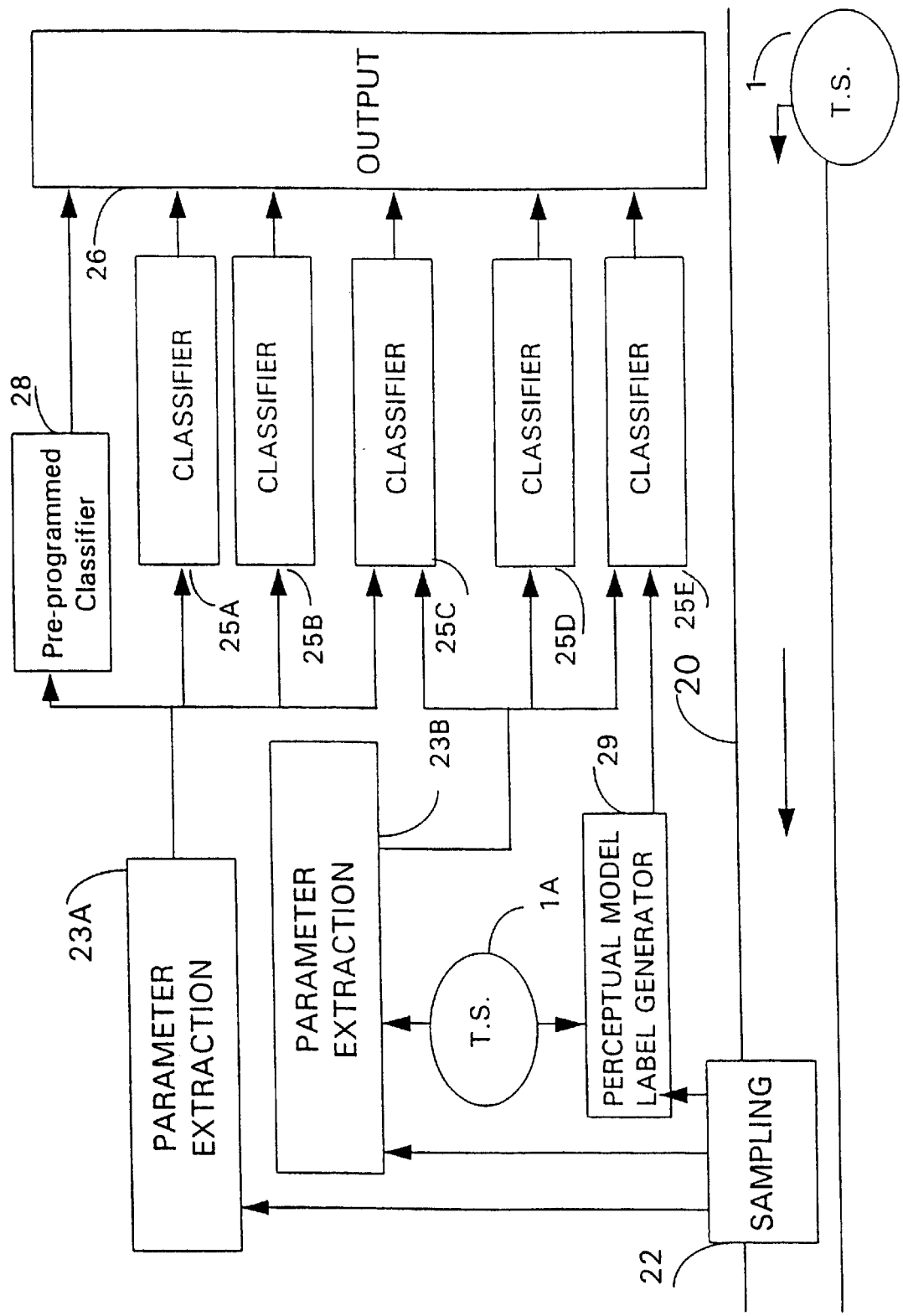
FIG. 8 shows, in block diagram form, a variant of FIG. 7 having a plurality of classifiers, and also illustrating an in situ retraining process.

The arrangement of FIG. 8 shows a modification of the system of FIG. 7, in which the system is trainable by means of a test signal transmitted over the system to be monitored. This allows the trainable process to be fine-tuned for actual operating conditions, and also allows further training of the system to allow it to adapt as the monitored system evolves. FIG. 8 also illustrates a multiple classifier architecture for the monitoring system. Although illustrated for handling video signals, it will be apparent that both the on-line training and the multiple classifier architecture are also suitable for use with the audio embodiment.

In FIG. 8 there is shown a traffic carrying communications system from which a sample of the signal traffic being carried can be taken by means of sampling unit 22. The sampled data are then analysed by means of a number of parameter extraction units 23A, 23B (two shown) each of which is arranged to measure an individual property e.g. spatial frequency, correlation, overall contrast level, etc. The parameters extracted thereby are passed to individual classification units 25A, 25B, 25C, 25D, 25E (typically neural nets). As shown, each classification unit makes use of parameters extracted from one or more of the parameter extraction units 23A, 23B etc. Each classification unit 25A, etc, delivers an output to an output co-ordination unit 26, which processes the outputs of the various classification units 25A, etc to generate a display. This arrangement allows each classifier (neural net) to be individually configured to identify the presence of a particular characteristic, thereby producing a simple binary (yes/no) output. By combining the outputs of such classifiers, a complex output can be generated, e.g. triggering an alert if a predetermined number of the classifiers generate an output.

The system also provides two training sample sources 1, 1A, one of which is positioned elsewhere in the communication system 20, and the other of which is positioned locally to the parameter analysis units 23A, 23B to provide a direct input thereto.

Also provided is a pre-programmed characteristic identification unit 28, which is shown as having an input from the parameter extraction unit 23A.

The classification units 25A to 25E are arranged as parallel classification units, each one being configured to identify a particular characteristic in the signal received by the sampling unit 22, in order to generate an output to the output coordination unit 26, indicative of whether that property is present or not. The property is itself measured according to the presence or absence of one or more parameters identified by the parameter extraction units 23A, 23B. For example, one classification unit 25A may identify whether a particular type of distortion is present, whilst another one will identify a second type of distortion. Further classification units may identify the perceptual severity of the overall distortion.

As the telecommunications network develops, new types of signal processing techniques may take place within the network, having different characteristics which may, in certain circumstances, result in new characteristic distortions. In order to allow the analysis system to be retrained to identify such distortions, and to adapt to changes in the existing network, a reconfiguration process is adopted. For this purpose one channel is temporarily taken out of use, in order to allow it to carry a training sample provided by a training sample generation unit 1. The training sample is extracted by means of the sampling unit 22 and compared with another sample, generated by a source 1A at the monitoring point, identical to the sample received over the communications link.

Associated with the source 1A of the second (locally generated) training data, is a perceptual model label generation unit 29 (as previously shown in detail in FIG. 6) which compares the signal received over the communications link 20 from the training source generation unit 1 with the locally generated training signal, in order to generate quality labels which are input to the trainable classification unit 25E. These labels are associated with the corresponding parameters generated by the parameter extraction unit 23B, in order to produce a network definition function for the classification unit 25E. Following this training process, the resulting network definition function is used to classify unknown parameter patterns corresponding to unknown samples extracted from the communications link 20 by the sampling unit 22. In this way classification units may be added to the original system, or existing ones reprogrammed, as the communication system 20 develops.

Not all the classification units are necessarily programmed by means of a training process. Where the characteristics are already known, a classification unit 28 may be pre-programmed to identify suitable parameters extracted by the parameter extraction unit 23A, 23B, etc. The analysis unit 28 operates in a similar manner to the trainable units 25A to 25E, but is pre-programmed to recognise known characteristics of particular types of signal degradation. For example, it is known that data compression may result in boundary blurriness, blockiness, fuzziness, jerkiness, and colour aberrations. In particular, in a video image involving much rapid movement, the MPEG signal compression system deals with overloads resulting from rapid movement in the image by reducing the pixel resolution, resulting in "blockiness", with characteristic rectilinear boundaries typically of 8×8 pixels. Multipath interference will produce two boundaries displaced by a fixed horizontal distance (known as "ghosting"). Fuzziness will tend to spread out the high spatial-frequency components of the edges themselves. Colour blurring may result in discrepancies between the edges defined by the different coloured components of the image. Low levels of contrast in one colour component, over the image as a whole, are indicative of a colour aberration (the image being tinted by the colour in question, or its chromatic complement. Low levels of contrast in the image as a whole are indicative of signal clipping. Complete correlation between the three colour components of the image is indicative of a monochrome image, which may indicate loss of the signal band carrying the colour information.

The degree of correlation between successive frames may reveal further types of degradation. For example large random differences between each successive frame are indicative of the presence of an interfering signal. The effect of randomly appearing light and dark spots on a video image (known as "snow") is an example of such a feature. This would be difficult to detect from a single sample, because the location of the individual spots is random. If the sample is completely different from the previous sample then this probably signifies that a scene change (change of camera shot) has taken place, and no useful temporal correlations would be available in such cases. However, if a scene is largely unchanged i.e. each frame is strongly correlated with the previous frame, but has differences from the previous frame which are neither correlated with each other, nor with similar differences from earlier frames, then this is an indication that white noise ("snow") is present in the signal.

Another time-dependent correlation which may be identified is a jerky image, caused by signal compression. This is particularly likely when the image is processed on a 'by exception' basis—each image is the same as the previous one, with certain differences, and it is only the differences which are transmitted. For a rapidly changing image, the data rate can be too slow to define all the necessary changes for each frame. The movement of features across an image is normally smooth. If a feature moves stepwise, this is indicative of a jerky image. Jerkiness produces edges whose positions correlate from one image to the next in a characteristic way, wherein one or more elements in each image of a group of successive images are in the same position, but elements in images of successive groups are displaced from each other.

A change of scene, identifiable by a complete and non-transient change in the positions of all edges, and/or a change in some characteristic such as average brightness, may be expected to correlate with a change in the overall characteristics of the audio channel (e.g. its loudness). An absence of such correlations over a number of such changes may indicate interference on the audio channel, or indeed loss of the audio signal.

In the classification unit 28 the parameters acquired from the parameter unit 23A are analysed to output a label for the output coordinator 26 indicative of the presence of parameters characteristic of specified types of distortion. So, for example, parameters identifying 8×8 pixel blocks would indicate overloading of the MPEG coding algorithm. A lack of clearly-defined high frequency content in the spectrum of the signal is indicative of an absence of clearly-defined edges, suggesting a fuzzy or out-of focus image. A high correlation between closely-spaced edge features suggests ghosting (multipath interference), etc. Features which do not correlate from one image to the next indicate a noisy signal ("snow").

As is illustrated for the trainable classification units 25A to 25E, several pre-programmed classification units 28 may also be provided, each dedicated to identifying a particular characteristic.

What is claimed is:

1. Training apparatus for training a signal classification analysis apparatus of the type arranged to detect predetermined components of a signal, characteristic of distortion being present in the signal, and for generating a classification indicative of the severity and/or types of distortion present, the training apparatus comprising:

means for providing a training sequence comprising a first signal and a distorted version of the first signal, analysis means for extracting individual segments from the training sequence and generating a distortion perception measure for indicating the extent to which the distortion of each segment would be perceptible to a human observer, and means for applying the distortion perception measures and the associated distorted signal segments to the signal classification analysis apparatus to determine the classifications to be applied to subsequently input signals.

2. Training apparatus as in claim 1, in which the analysis means comprises:

measurement means for estimating the effect which would be produced on the human sensory system by distorted and undistorted versions of the same signal, means for determining the differences between the said effects, and means for generating said distortion perception measure in dependence upon said difference.

3. Training apparatus as in claim 1 in which the analysis means has means for generating a distortion perception measure whose value is dependent upon perceptual significance to a human observer of said distortion, and dependent non-linearly upon the amplitude of said distortion.

4. Training apparatus as in claim 1 in which the analysis means comprises measurement means for generating a plurality of spectral component signals of said test signal and/or said distorted signal.

5. Training apparatus as in claim 4, in which the measurement means has means for estimating, for each spectral component signal, the masking effect which that spectral component signal would produce on the human sensory system.

6. Training apparatus as in claim 1 in which the analysis means includes measurement means for estimating the effect which said distortion would produce on the human sensory system taking into account the temporal persistence of said effect.

7. Training apparatus as in claim 6, in which the analysis means comprises:

measurement means for generating a time sequence of successive processed signal segments from said test signal and/or said distorted signal, the value of at least some signal segments being generated in dependence upon portions of said test signal and/or distorted signal which precede and/or succeed said signal segments.

8. Training apparatus as in claim 1 in which the analysis means comprises:

measurement means for decomposing the distorted signal into a plurality of spectral component bands, the spectral component bands being shaped to provide spectral masking, and for calculating the temporal masking of the signal due to preceding and/or succeeding temporal portions thereof;

means for forming, for each of the spectral component signals, a representation of the difference between the component signal of the distorted signal and a correspondingly calculated component of the test signal; and calculation means for generating said distortion perception measure from said difference representation.

9. Training apparatus as in claim 8 in which the calculation means generates a measure of the spectral and temporal distribution of the distortion from said difference signal.

10. Training apparatus as in claim 1 comprising means for generating classifications indicative of the type of distortion that is present.

11. Training apparatus as in claim 10, comprising a first trainable processing apparatus for identifying the overall quality of the signal, and a second trainable processing apparatus for identifying the type or types of distortion present.

12. Training apparatus as in claim 1 configured to analyse speech signals.

13. Training apparatus as in claim 1 configured to analyse video signals.

14. Training apparatus as in claim 13, comprising means for identifying part of the image represented by the video signal having the greatest perceptual significance to a human observer, and means for weighting those parts of the image in the input to the analysis means.

15. Training apparatus as in claim 14, having:
means for identifying boundaries of image elements, and
means for weighting those parts of the image containing such boundaries as being of greater perceptual significance.

16. Training apparatus as in claim 13, comprising means for analysing spatial frequencies within the video images.

17. Training apparatus as in claim 16 having:
means for identifying boundaries of image elements, and
means for weighting those parts of the image containing such boundaries as being of greater perceptual significance;
means for analyzing spatial frequencies within the video images; and
means for identifying high frequency spatial frequency components in the image.

18. Training apparatus as in claim 1 comprising means to generate from the training sequence a plurality of distortion perception measures for application to a plurality of trainable processing apparatuses.

19. Signal classification apparatus for detecting predetermined signal components in a signal, the components being characteristic of distortion being present in the signal, and having means for generating an output indicative of the presence, severity and/or type of distortion present, comprising:
a training apparatus as in claim 1 for programming the signal classification apparatus to identify such distortions.

20. Signal classification apparatus as in claim 19, comprising two or more signal classification elements, at least one of which is programmable by the training apparatus.

21. Signal classification apparatus as in claim 20, wherein at least one signal classification element is pre-programmed to identify a predetermined distortion type.

22. Apparatus as in claim 21, wherein a pre-programmed signal classification element is arranged to identify the spreading out, or complete absence, of elements of a video image having high spatial frequencies, indicative of the image being blurred.

23. Apparatus as in claim 21 wherein a pre-programmed signal classification element is arranged to identify boundaries of elements of a video image which are moving, and weighting those boundaries of the image where such movement occurs as an input to the distortion perception measurement means.

24. Apparatus as in claim 21 wherein a pre-programmed signal classification element is arranged to identify in a video image rectilinear blocks, each block being of uniform colour and a predetermined size.

25. Apparatus as in claim 21 wherein a pre-programmed signal classification element is arranged to identify correlations in boundaries displaced from each other within a video image, indicative of multipath interference in the video signal.

26. Apparatus as in claim 21 wherein a pre-programmed signal classification element is arranged to identify correlations between groups of successive video images indicative of jerky motion.

27. Apparatus as in claim 21 wherein a pre-programmed signal classification element is arranged to identify individual pixel elements of an image which are uncorrelated with other picture elements of the same image, and uncorrelated with similar elements in successive images, indicative of white noise appearing on the input video signal.

28. A method for training a trainable signal analysis process of the type in which predetermined components of a signal characteristic of distortion being present in the signal are detected, and a classification indicative of the severity and/or types of distortion present is generated, the training method comprising the steps of:
providing a training sequence comprising a first signal and a distorted version of the first signal,
extracting from the training signal a plurality of segments,
for each segment measuring the extent to which the distortion of the signal will be perceptible to a human observer, and
defining a classification operation in accordance with the result of said measurement, the classification operation being arranged to classify subsequently input signals in accordance with the presence or absence of perceptually significant distortion.

29. A method as in claim 28, in which the measurement process:
estimates the effect which would be produced on the human sensory system by distorted and undistorted versions of the same signal,
determines the differences between the said effects, and
generates said distortion perception measure in dependent upon said difference.

30. A method as in claim 28 in which the measurement process generates said distortion perception measure to depend upon the significance to a human observer of said distortion, and to depend non-linearly upon the amplitude of said distortion.

31. A method as in claim 28, in which the measurement process generates a plurality of spectral component signals of said test signal and/or said distorted signal.

32. A method as in claim 31, in which the measurement process estimates, for each spectral component signal, the masking effect which that spectral component signal would produce on the human sensory system.

33. A method as in claim 28, in which said measurement process estimates the effect which said distortion would produce on the human sensory system taking into account the temporal persistence of said effect.

34. A method as in claim 28, in which said measurement process:

decomposes the distorted signal into a plurality of spectral component bands, the spectral component bands being shaped to provide spectral masking;

calculates the temporal masking of the signal due to preceding and/or succeeding temporal portions thereof;

forms, for each of the spectral component signals, a representation of the difference between the component signal of the distorted signal and a correspondingly calculated component of the test signal; and generates said distortion perception measure from said difference representation.

35. A method as in claim 34 in which the analysis process generates a measure of the spectral and temporal distribution of the distortion from said difference signal.

36. A method as in claim 28, the step of generating from classification operation an indication of the type of distortion that is present.

37. A method as in claim 36 comprising the steps of identifying the overall quality of the signal, and identifying the type or types of distortion present.

38. A method as in claim 28, in which the signals are audio signals.

39. A method as in claim 38, in which the signals are speech signals.

40. A method as in claim 28, in which the signals are video signals.

41. A method as in claim 40 wherein the signals are analysed in segments corresponding to individual frames of the video signal.

42. A method as in claim 40 comprising the steps of:

identifying parts of the image represented by the signal of relatively greater perceptual significance to a human observer, and providing a weighting for those parts of such images as an input to the distortion perception measurement process.

43. A method as in claim 42, comprising the steps of:

identifying boundaries of image elements, and weighting those parts of the image containing such boundaries as being of greater perceptual significance.

44. A method as in claim 41, comprising the step of analysing spatial frequencies within the video images.

45. A method as in claim 44 comprising the steps of:

identifying boundaries of image elements, weighting those parts of the image containing such boundaries as being of greater perceptual significance, and identifying high frequency spatial frequency components in the image.

46. A method as in claim 41 comprising the steps of:

analysing the video image in terms of three different coloured images, and identifying correlations, or lack of correlations, between the images.

47. A method of training a trainable signal analysis apparatus, said method comprising the steps of:

transmitting a first training sequence from a remote location, over a network to be monitored, to a monitoring location;

generating a second, identical, training sequence at the monitoring location;

performing the analysis process of claim 28 to measure the perceptual degree of distortion in the training sequence received at the monitoring location from the remote location, by comparison with the second training sequence;

classifying the resulting measures according to said perceptual degree of distortion; and configuring the trainable process according to the resulting classification.

48. Method as in claim 28, wherein the training signal is applied to a plurality of perceptual analysis processes for generating a plurality of classification operations, each for applying to an individual trainable process such that an output can be generated according to the combined output of the trainable processes.

49. A classification means for signal classification apparatus, the signal classification apparatus being arranged to detect and classify distortions occurring in signals input to the apparatus, in accordance with classification data stored in the classification means, wherein the data stored in the classification means has been generated as in claim 28.

* * * * *